United States Patent Office 3,353,785
Patented Nov. 21, 1967

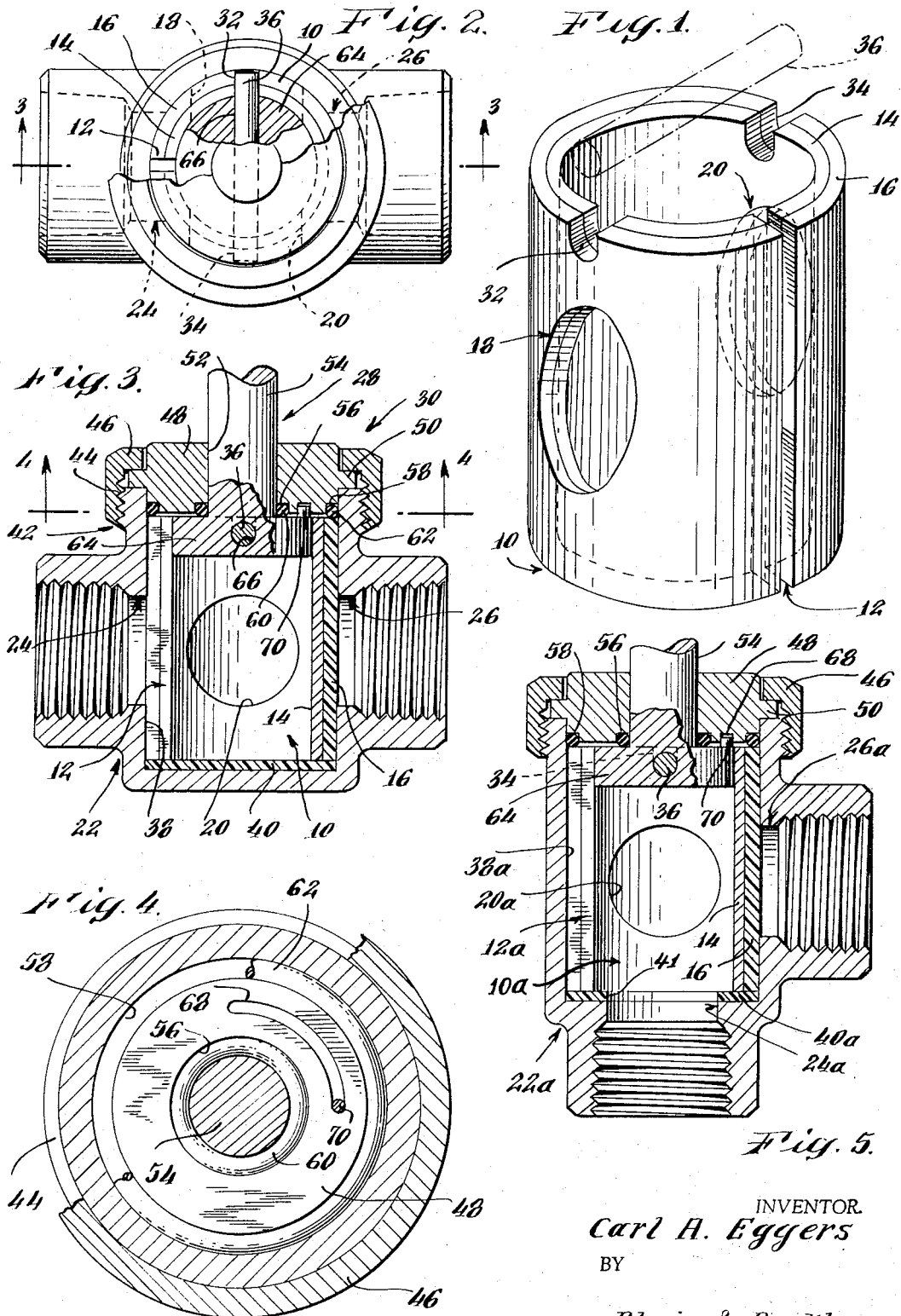

3,353,785
SPLIT SLEEVE PLUG VALVE HAVING BONDED POLYMERIC MATERIAL LAYER
Carl A. Eggers, Bridgeport, Conn., assignor to Jenkins Bros., Bridgeport, Conn., a corporation of New Jersey
Filed Jan. 21, 1965, Ser. No. 426,800
7 Claims. (Cl. 251—175)

ABSTRACT OF THE DISCLOSURE

The disclosure comprises a plug valve having a substantially cylindrical sleeve plug with a longitudinal split to which a layer of low-friction polymeric material is bonded around the plug exterior. Preferably the polymeric material is polytetrafluoroethylene. The inlet port of the valve may be aligned with either a port in the side of the split sleeve plug or may be positioned to open into the split sleeve plug from its underside. The sleeve plug has an outlet port therein spaced from the longitudinal split. The bonding of the polytetrafluoroethylene prevents entry of fluids between the metal sleeve and the layer of low-friction polymeric material when the plug is in a closed position.

---

This invention relates to a plug valve for controlling the flow of fluids and more particularly to a plug valve having a split sleeve closure plug wherein fluid pressure is admitted to the interior of the plug when the valve is in a closed position to urge the split sleeve plug into sealing engagement with the valve body.

Plug valves are in general well known in the prior art and comprise a valve body having inlet and outlet ports with a rotatable plug which opens and closes the valve when rotated through approximately 90°. In particular, many prior art plug valves have employed a tapered plug for the valve closure member to improve the closure seal between the plug and valve body. Such constructions are quite complex however, and are more expensive than valves having cylindrical plugs.

Tapered plug valves are also known in the prior art wherein a sleeve or liner surrounds the plug and is interposed between the plug and valve body. Such constructions are shown in U.S. Patents Nos. 3,066,909 and 3,133,-722.

In both of the above prior art patents the valve plug is rotated within the liner, which is made of an elastic polymeric material such as polytetrafluoroethylene. Distortion of the sleeve or liner by line pressure is a problem, however, and pressure equalizing vents are required to prevent shearing or tearing of the liner upon rotation of the plug. Such prior art tapered plug valves are relatively expensive to manufacture.

A plug valve made in accordance with my invention employs a split sleeve plug which is separated along its entire height to form a slightly open ring in axial cross-section. The split serves a two-fold purpose, to admit line pressure to the interior of the plug and to permit expansion of the sleeve plug by such pressure to uniformly urge the sleeve exterior into better sealing engagement with the valve bore.

The plug valve of my invention employs a cylindrical sleeve plug and does not require a separate liner or other insert in the plug bore. A plug valve with a cylindrical closure member is less expensive to manufacture than a tapered plug valve, since both the plug and valve body bore can be made more economically. Thus, a plug valve having a cylindrical plug is preferable if the sealing and operating characteristics are as good or better than a comparable tapered plug valve.

Accordingly, it is an object of this invention to provide a plug valve having a split sleeve plug.

Another object of the invention is to provide a plug valve of the above character wherein line pressure may be utilized to urge the split sleeve plug into sealing engagement with the valve body when the valve is in a closed position.

A further object of the invention is to provide a plug valve of the above character which is reliable over a long period of usage and is relatively inexpensive to manufacture.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view of a split sleeve plug according to my invention.

FIGURE 2 is a top view of a plug valve on a smaller scale and employing a split sleeve plug in accordance with my invention.

FIGURE 3 is a side view in partial section of the plug valve shown in FIGURE 2 taken along lines 3—3 of FIGURE 2 looking in the direction of the arrows.

FIGURE 4 is an enlarged sectional view taken along lines 4—4 of FIGURE 3 looking in the direction of the arrow.

FIGURE 5 is a side sectional view of another embodiment of a plug valve according to my invention.

Like reference characters denote like parts throughout the several figures.

The invention will now be generally described. As shown in FIGURE 1, the split sleeve plug 10 is preferably cylindrical in shape with a longitudinal split 12 extending the entire height of the plug. The plug is preferably made of an inner metallic layer 14 to which is bonded a tough, low friction layer 16 of polymeric material. A pair of opposed openings 18, 20 are provided in the wall of the plug for alignment with the inlet and outlet of the valve when in an open position.

As shown in FIGURE 3, the plug 10 is rotatably positioned in a valve body generally referred to at 22 which is provided with an inlet 24 and an outlet 26. An operating stem assembly 28 and sealing cap assembly 30 seal off the upper portion of the valve body while providing means for rotating the split sleeve plug 10 through 90° of arc to open and close the valve. As shown in FIGURES 2 and 3, the valve is in a closed position. Accordingly, the split 12 of the cylindrical plug 10 faces the inlet side 24 of the valve body while the outlet 26 is closed off. Thus, in a closed position the line pressure enters the split sleeve plug 10 and tends to expand the plug within the valve body, thus pressing the plug exterior against the valve bore 38, providing a more effective seal about the outlet opening 26. In a valve open position the plug 10 is rotated 90° to align openings 18 and 20 of the plug with openings 24, 26, respectively, of the valve body.

An alternate embodiment of the invention is shown in FIGURE 5 wherein the inlet 24a of the valve body 22a opens into the bottom of the cylindrical plug and a single opening 20a is provided in the split sleeve plug for alignment with outlet opening 26a when the valve is in an opened position. As shown in FIGURE 5, the valve is in a closed position with the split 12a of the plug facing away from the outlet opening 26a. Thus, line pressure tends to expand the split sleeve plug in the same manner as pointed out above when the valve is closed.

The invention will now be described with more particularity. As shown in FIGURE 1, the split sleeve plug 10 is made from a cylindrical sleeve of metal tubing which is coated with a polymeric material 16 such as polytetrafluorethylene. The split 12 may then be made by cutting longitudinally through a wall of the plug. Similarly, the fluid openings 18 and 20 may then be formed in the plug walls with their centers at right angles to the split 12. Slots 32, 34 are also formed through both layers of the sleeve plug for engagement with operating pin 36, as best seen in FIGURES 2 and 3. Thus, after the cylindrical sleeve plug has been formed, it is still cylindrical in shape and is in the form of a slightly open ring in axial cross-section.

Alternately, the split 12, openings 18, 20 and slots 32, 34 may be formed in the metallic sleeve 14 and subsequently coated or covered with the layer 16 of polymeric material such as polytetrafluoroethylene.

I have found that for a valve having inlet and outlet connections for one inch pipe, that a metal sleeve having a thickness of $\frac{3}{32}$ of an inch covered with about $\frac{1}{16}$ inch of polytetrafluoroethylene (Teflon) is satisfactory. In this regard it is pointed out that the relative thicknesses of the metal sleeve 14 and polymeric layer 16 are not necessarily to scale for better illustration of the plug in section.

Referring now to FIGURES 2 and 3, it will be seen that the split sleeve plug 10 closely fits into the bore 38 of valve body 22 and rests upon a bearing member 40 in the shape of a disk, which is also preferably made of polymeric material such as polytetrafluoroethylene. The split sleeve plug 10 is thus seated on a low friction surface having some resilience.

The upper portion 42 of the valve body has threads 44 for engagement with a threaded union ring 46 which secures a sealing cap 48 having a flange 50 to the top portion of the valve body. The sealing cap 48 has a central opening 52 for receiving a valve operating stem 54 and is provided with interior and exterior lower sealing grooves 56, 58 which respectively accommodate O-rings 60, 62. The O-ring 60 is of the dynamic type and the O-ring 62 is of the static type. When the sealing cap 48 is brought into sealing engagement with the valve body by the union ring 46, a metal to metal seal is effected by the flange 50 and O-rings 60, 62 are compressed into a sealing condition.

The operating stem 54 is provided with an enlarged lower end portion 64 having a transverse bore 66 for receiving operating pin 36. As best seen in FIGURE 2, the ends of pin 36 extend beyond the enlarged lower portion 64 of the operating stem to engage slots 32, 34 to provide the linkage for rotation of the sleeve plug 10 by the operating stem 54.

As shown in FIGURE 4, the cap 48 is provided with an arcuate groove 68 which engages lug 70 which protrudes from the upper surface of valve stem portion 64. The arcuate groove 68 extends through an arc of 90° and limits rotation of the valve stem and split sleeve plug to operation only through that 90° quadrant to prevent the split 12 from being positioned adjacent the outlet opening 26 instead of the inlet opening 24 when the valve is closed. The cap 48 is therefore preferably keyed for positioning in a predetermined relationship when secured to the valve body.

In operation, the valve when in a closed position, as shown in FIGURES 2 and 3, will provide for more effective sealing of the plug against the interior of bore 38 because of line pressure on the inside of the split sleeve plug. The line pressure inside the split sleeve plug forces the plug into closer contact with the transverse bore 38 of the valve body to effect the seal. An increase in line pressure will thus increase the sealing force with which the plug exterior is pressed against the valve body bore. The polymeric material such as polytetrafluoroethylene around the split sleeve plug has some resilience and aids in providing a more effective seal. The polytetrafluorethylene material further has low friction characteristics which make the plug relatively easy to rotate.

The embodiment shown in FIGURE 5 provides for flow of fluids through the valve at right angles. The inlet opening 24a is positioned at the bottom of the valve body 22a and the sleeve 10a is formed of a metal interior 14 with a layer 16 of polymeric material such as polytetrafluorethylene bonded thereto. The split 12a is preferably positioned at least 90° from the single side wall opening 20a in the plug to insure better sealing. As shown in FIGURE 5, the valve is in a closed position with line pressure entering through the inlet 24a and through the annular bearing member 40a which has a central opening 41. The annular bearing member 40a is also preferably made of polytetrafluoroethylene. In a closed position, line pressure forces the exterior of plug 10a into closer sealing engagement with the valve body bore 38a to effect a better seal.

In an open position the single side opening 20a is rotated 90° from the position shown in FIGURE 5 to align itself with outlet opening 26a. The cap assembly and operating stem assembly in the embodiment shown in FIGURE 5 are the same as that shown in FIGURES 2, 3 and 4.

It should be understood that other embodiments of the invention such as other angles for positioning of the inlet or outlet ports are contemplated as being within the spirit of the invention. Further, while polytetrafluorethylene is the preferred material for the exterior of the split sleeve plug, other low friction resilient materials may be employed for this purpose. In some applications the split sleeve plug may be made of a single material. Thus, the split sleeve plug may be made entirely of metal with a coating of polytetrafluoroethylene or other polymeric material on the interior bore 38 of the valve body 22. In still other applications, the split sleeve plug may be made entirely from polymeric material.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A plug valve comprising, in combination,
    (A) a valve body having means forming
        (1) an inlet,
        (2) an outlet,
        (3) and a cylindrical plug bore;
    (B) a cylindrical sleeve plug rotatably positioned in said plug bore,
        (1) said sleeve plug having a longitudinal split,
        (2) and having means forming fluid passage openings in said sleeve plug;
    (C) a layer of low-friction polymeric material bonded to the exterior of said sleeve plug;
    (D) means for rotating said sleeve plug in said plug bore; and
    (E) sealing means for enclosing said sleeve plug within said valve body,
whereby fluids under pressure are retained against entering between said sleeve and the layer of polymeric material by said bonding.

2. A plug valve as defined in claim 1 wherein the plug bore is substantially axially aligned with said inlet.

3. The plug valve defined in claim 1 wherein said sleeve plug is made of metal having an exterior covering of polytetrafluoroethylene bonded thereto.

4. A plug valve comprising, in combination,
(A) a valve body having means forming
   (1) an inlet,
   (2) an outlet,
   (3) and a transverse cylindrical bore;
(B) a substantially cylindrical sleeve plug rotatably positioned in said transverse bore,
   (1) said sleeve plug having a layer of low friction polymeric material bonded to its exterior surface,
   (2) said sleeve plug being split longitudinally to form a slightly open ring in axial cross-section,
   (3) means forming fluid passage openings in said sleeve plug for alignment with said inlet and outlet of said valve body,
      (a) said openings being spaced from said longitudinal split;
(C) operating means extending into said valve body and engaging said sleeve body for rotating said sleeve body within said transverse bore; and
(D) a seal assembly secured to said valve body and around said operating means to enclose said sleeve plug in said valve body while permitting rotation of said operating means,
whereby fluids under pressure are retained against entering between said sleeve and the layer of polymeric material by said bonding.

5. A plug valve as defined in claim 4 wherein said sleeve plug is made of metal having an exterior covering of polytetrafluoroethylene bonded thereto.

6. A plug valve as defined in claim 4 wherein there is provided a bearing member of low friction polymeric material in said transverse bore upon which said sleeve plug rotates.

7. In a plug valve having a valve body with means forming inlet and outlet openings and sealed means for rotating a plug in a bore of said valve body from an open to a closed position, a valve plug assembly comprising a longitudinally split cylindrical sleeve in the form of a slightly open ring in axial cross-section, said sleeve having means forming fluid passage openings therethrough, with at least one of said opening centers being disposed at least 90° from said split and a layer of polytetrafluoroethylene bonded to the exterior of said sleeve.

References Cited

UNITED STATES PATENTS

| | | | |
|---|---|---|---|
| 329,809 | 11/1885 | Buffet | 251—175 |
| 1,160,342 | 11/1915 | Taft | 251—192 |
| 1,731,224 | 10/1929 | Kiley | 251—182 X |
| 2,511,477 | 6/1950 | Mueller | 251—182 |
| 2,844,162 | 7/1958 | Huslander | 137—246.16 |
| 3,049,333 | 8/1962 | Wright | 251—175 X |
| 3,073,336 | 1/1963 | Johnson | 251—317 X |
| 3,133,622 | 5/1964 | McGuire | 251—317 X |
| 3,155,368 | 11/1964 | Shafer | 137—246.15 X |
| 3,282,295 | 11/1966 | Skriletz | 251—182 X |

FOREIGN PATENTS

| | | |
|---|---|---|
| 755,536 | 8/1956 | Great Britain. |
| 1,081,975 | 6/1954 | France. |

CLARENCE R. GORDON, *Primary Examiner.*